(12) United States Patent
Shankar (10) Patent No.: US 12,531,819 B2
(45) Date of Patent: Jan. 20, 2026

(54) PERSONALIZED ARTIFICIAL INTELLIGENCE CHATBOT

(71) Applicant: Bank of America Corporation, Charlotte, NC (US)

(72) Inventor: Manoj Shankar, Bothell, WA (US)

(73) Assignee: Bank of America Corporation, Charlotte, NC (US)

( * ) Notice: Subject to any disclaimer, the term of this patent is extended or adjusted under 35 U.S.C. 154(b) by 33 days.

(21) Appl. No.: 18/438,605

(22) Filed: Feb. 12, 2024

(65) Prior Publication Data

US 2025/0260654 A1 Aug. 14, 2025

(51) Int. Cl.
| | |
|---|---|
| *G06F 15/16* | (2006.01) |
| *G06Q 40/02* | (2023.01) |
| *G06Q 40/04* | (2012.01) |
| *H04L 51/02* | (2022.01) |
| *H04L 51/216* | (2022.01) |
| *H04L 67/306* | (2022.01) |

(52) U.S. Cl.
CPC ............ *H04L 51/02* (2013.01); *G06Q 40/02* (2013.01); *G06Q 40/04* (2013.01); *H04L 51/216* (2022.05); *H04L 67/306* (2013.01)

(58) Field of Classification Search
CPC ..... H04L 51/02; H04L 51/216; H04L 67/306; G06Q 40/02; G06Q 40/04
USPC .......................................................... 709/206
See application file for complete search history.

(56) References Cited

U.S. PATENT DOCUMENTS

| | | | |
|---|---|---|---|
| 11,444,893 B1* | 9/2022 | Kalluri | G10L 15/22 |
| 11,928,426 B1* | 3/2024 | Gutzeit | H04L 51/02 |
| 2020/0310888 A1* | 10/2020 | Gopalan | G06F 21/31 |
| 2021/0264520 A1* | 8/2021 | Cummings | G06Q 40/12 |
| 2024/0031367 A1* | 1/2024 | Pringle | G06N 5/02 |
| 2024/0176902 A1* | 5/2024 | Kaidi | G06F 21/604 |
| 2024/0412720 A1* | 12/2024 | Vasylyev | G06F 16/90332 |
| 2025/0095808 A1* | 3/2025 | Davelaar | G06F 3/0482 |

* cited by examiner

*Primary Examiner* — Alan S Chou
(74) *Attorney, Agent, or Firm* — Weiss & Arons LLP (57) ABSTRACT

Apparatus and methods for an artificial intelligence/machine learning ("AI/ML") chatbot personalized to a user are provided. The apparatus and methods may include a personalized AI/ML chatbot on a server receiving one or more financial records about a user. The personalized chatbot may analyze the one or more records. The personalized chatbot may determine one or more financial services to present to the user based on the financial records. The personalized chatbot may provide links to the recommended financial services. The personalized chatbot may be trained on responses from the user.

19 Claims, 6 Drawing Sheets

PERSONALIZED ARTIFICIAL INTELLIGENCE CHATBOT

FIELD OF TECHNOLOGY

Aspects of the disclosure relate to providing apparatus and methods for providing a personalized artificial intelligence/machine learning chatbot to a user.

BACKGROUND OF THE DISCLOSURE

Customers, employees, and others are required to interact with automated chatbots often when communicating with online stores and other entities. These chatbots may be automated through various methods. These methods may include artificial intelligence/machine learning ("AI/ML") algorithms.

However, automated chatbots, including those using AI/ML algorithms, are not personalized to particular users. In general, AI/ML algorithms incorporate information from a large variety of past users or other training data to generate an output. This method may be limited when attempting to incorporate particular, unique information about a particular user to provide specific, personalized prompts and responses to the particular user.

This issue may be particularly acute with financial institutions and similar entities, as a particular user's financial information is unique and confidential. Providing only generic responses and prompts in a chatbot may be disconcerting and not as useful to a particular user. Financial institutions may have access to confidential financial information for a particular user, and, through this invention, may incorporate that information to create a personalized chatbot to interact with the particular user.

Therefore, it would be desirable for apparatus and methods for providing a personalized artificial intelligence/machine learning chatbot to a user.

SUMMARY OF THE DISCLOSURE

It is an object of this disclosure to provide apparatus and methods for a personalized artificial intelligence/machine learning chatbot.

An apparatus for a personalized artificial intelligence/machine learning ("AI/ML") chatbot is provided. The apparatus may include a central server and a user device belonging to a user.

The central server may include a server communication link, a server processor, and a server non-transitory memory. The server non-transitory memory may be configured to store at least a server operating system, a personalized AI/ML chatbot that runs on the server processor, and an authentication engine that runs on the server processor.

The user device may belong to or be assigned to a particular user. The user device may include a device communication link, a device processor, and a device non-transitory memory. The device non-transitory memory may be configured to store at least a device operating system, a user interface of the personalized AI/ML chatbot that runs on the device processor, and a device authentication program that runs on the device processor and communicates with the authentication engine.

The personalized AI/ML chatbot may be personalized for the user. The personalized AI/ML chatbot may receive access to one or more financial records of the user. The personalized AI/ML chatbot may create a profile of the user. The profile of the user may include authentication data and the one or more financial records (i.e., the data or information within the one or more financial records).

When the user operates the user interface on the user device, the device authentication program may transmit an authentication request to the authentication engine. The authentication engine may receive the authentication request.

When the authentication engine authenticates the user, the personalized AI/ML chatbot may recommend one or more financial services to the user based on the user profile. The personalized AI/ML chatbot may display an access link to each of the one or more financial services it has recommended.

In an embodiment, the user device may be a smartphone.

In an embodiment, when the user selects one of the access links, the personalized AI/ML chatbot may analyze the selection to train the personalized AI/ML chatbot.

In an embodiment, when the user fails to select any of the access links within a pre-determined length of time, the personalized AI/ML chatbot may analyze the failure to select to train the personalized AI/ML chatbot.

In an embodiment, the user may communicate with the personalized AI/ML chatbot via the user interface.

In an embodiment, the user interface may include VR/AR (virtual reality/augmented reality) compatibility.

In an embodiment, the personalized AI/ML chatbot may include an avatar. The avatar may represent the chatbot.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

It is an object of this disclosure to provide apparatus and methods to personalize an artificial intelligence/machine learning enabled chatbot to a particular user.

In this disclosure, an entity may include a company, government, building, website, service, an application, an individual, and other entities.

An apparatus for a personalized artificial intelligence/machine learning ("AI/ML") chatbot is provided. The apparatus may include a central server and a user device belonging to a user. Each of these devices or computing systems may be a computing device in various form factors, such as mobile phones, smart cards, desktops, laptops, tablets, etc.

In various embodiments, the server may be centralized or decentralized (i.e., distributed).

The central server may include a server communication link, a server processor, and a server non-transitory memory.

The server non-transitory memory may be configured to store at least a server operating system, a personalized AI/ML chatbot that runs on the server processor, and an authentication engine that runs on the server processor.

In an embodiment, the central server may be distributed, to utilize a larger pool of computing resources and provide redundancy. Centralized servers may be easier to secure but also provide a single failure point. Distributed servers may be more robust but may provide multiple avenues for malicious actors to target.

All communication links in this disclosure may include any necessary hardware (e.g., antennae) and software to control the link. Any appropriate communication link may be used. In an embodiment, the apparatus may use a computer network. In an embodiment, that network may be the Internet. In another embodiment, the network may be an internal intranet. An internal intranet may be more limited than the Internet, but it may also be more secure. In an embodiment, the network may be encrypted.

The server may include a server processor or processors, as well as server non-transitory memory. The server non-transitory memory may include an operating system, a copy of a personalized AI/ML chatbot, as well as an authentication engine/program/module that runs on the processor. The memory may also include any other necessary programs or data to run. In an embodiment, the server non-transitory memory may include data, in a database or otherwise, to allow the authentication engine to authenticate a particular user.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

Processor(s) may control the operation of the apparatus and its components, which may include RAM, ROM, an input/output module, and other memory. The microprocessor(s) may also execute all software running on the apparatus—e.g., the operating system and any applications such as the personalized chatbot and authentication engine and any security protocols. Other components commonly used for computers, such as EEPROM or Flash memory or any other suitable components, may also be part of the apparatus.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory in this disclosure may be comprised of any suitable permanent storage technology—e.g., a hard drive or other non-transitory memory. The memory may store software including an operating system and any application(s) (such as the personalized AI/ML chatbot) along with any data needed for the operation of the apparatus and to allow authentication of a user. The data may also be stored in cache memory, or any other suitable memory. Alternatively, some or all of computer executable instructions (alternatively referred to as "code") may be embodied in hardware or firmware.

The user device may belong to or be assigned to a particular user by an entity. The user device may be associated with a particular user through any suitable method (such as a login, MAC address, password, PIN, etc.).

The user device may include a device communication link, a device processor, and a device non-transitory memory. The device non-transitory memory may be configured to store at least a device operating system, a user interface (or program) that may interact with the personalized AI/ML chatbot that runs on the device processor, and a device authentication program that runs on the device processor and communicates with the authentication engine.

In an embodiment, the device authentication program may be part of the user interface or program. That is, the device authentication program may be one module or portion of a larger program that includes the user interface.

In an embodiment, the user interface (or program) may be accessed through a web browser. In an embodiment, the user interface (or program) may be streamed to the user device.

In an embodiment, the device authentication program may be accessed through a web browser.

In an embodiment, the device authentication program may be streamed to the user device.

The personalized AI/ML chatbot may be personalized for the user in numerous ways. To be personalized, the AI/ML chatbot will provide answers and responses that may only apply to or make sense to a particular user. To be personalized, the AI/ML chatbot will provide answers and responses to a particular user that may take into account information or data that is only applicable to the particular user.

To provide personalized responses and interactions, the personalized AI/ML chatbot may receive access to one or more financial (or other) records of the user. The access may be received from an entity (such as a financial institution) or from the user. The user or entity may grant the chatbot access to some or all records.

In various embodiments, the personalized chatbot may be pre-loaded or personalized before the user begins a communications session with the chatbot. The one or more financial records may be saved from an earlier conversation or process (such as an initial sign-in). Or the analysis of the records and other information may be saved.

In other embodiments, the chatbot may be personalized in real-time. For example, a user may begin a communications session with the chatbot. The user may be authenticated. After authentication, the chatbot may receive access to one or more financial records of the user. The user may grant access to the one or more records, or the chatbot may receive access from an entity, database, or elsewhere. Then the personalized chatbot may analyze the records, along with other information, to personalize the chatbot for the user. Creating the personalized chatbot in real-time may require more processing power but may decrease the amount of storage space required by the server.

In an embodiment, the AI/ML chatbot may not use the one or more records to train or update its model(s) for other users. In an embodiment, the AI/ML chatbot may use the one or more records to train or update its model(s) for other users.

The personalized AI/ML chatbot may create a profile of the user. The profile may be encrypted. The profile may be encrypted through any appropriate encryption method or algorithm. The profile of the user may include authentication data and the one or more financial records (or other records). The profile of the user may include data or information within the one or more financial records. The records or other data may be modified or encoded into digital data readable by the chatbot by the personalized chatbot through any standard method, such as optical character recognition.

The profile of the user may be modified over time as additional information or records are provided to the chatbot. The profile of the user (i.e., the data within the profile) may be used to generate personalized responses and prompts displayed by the chatbot.

The user may operate the user interface by opening an application (or, e.g., a browser tab or location) and initiating a conversation with the chatbot through the user interface. The user may request a service, have a question, or begin a conversation. In various embodiments, the user may interact with the user interface through a mouse and keyboard, a touchscreen, through a video camera, through a microphone, or through any other suitable input method.

When the user operates the user interface on the user device, the device authentication program may transmit an authentication request to the authentication engine. The transmission may be over a communication link connected to a network, such as the Internet, or an internal network. The authentication request may include a username and password, or other identifying data (such as a MAC address of the user device) that may be used to authenticate the user. The authentication engine may receive the authentication request.

The authentication engine may evaluate the authentication request and determine whether to authenticate the user or deny authentication. Any standard authentication method may be used.

When the authentication engine authenticates the user, the personalized AI/ML chatbot may recommend one or more financial services to the user based on the user profile. The recommendations may also be based on any inputs received from the user, such as a specific request, or inputs analyzed by the personalized chatbot.

When the personalized chatbot determines that one or more financial services should be recommended, the personalized AI/ML chatbot may display an access link to each of the one or more financial services it has recommended. The access link may be a hyperlink, or a link to an application store, or any other suitable link. The link may be selectable, clickable, or interactable with any suitable method.

In an embodiment, the user device may be a smartphone. As smartphones are ubiquitous, they may provide the most practical access by a user to a personalized chatbot.

In an embodiment, when the user selects one of the access links, the personalized AI/ML chatbot may analyze the selection to train the personalized AI/ML chatbot. Any inputs made by the user, including selecting a link provided by the chatbot, may be used by the personalized chatbot to train the personalized chatbot for future conversations or later in the same conversation.

In an embodiment, when the user fails to select any of the access links within a pre-determined length of time, the personalized AI/ML chatbot may analyze the failure to select to train the personalized AI/ML chatbot. Any inputs made by the user, including not selecting a link provided by the chatbot, may be used by the personalized chatbot to train the personalized chatbot for future conversations or later in the same conversation.

In an embodiment, the pre-determined length of time may be one minute, 30 seconds, or any other suitable length of time. In an embodiment, the chatbot may analyze the circumstances and automatically lengthen or shorten (i.e., vary) the length of time based on various factors. These factors may include current latency over the network, past history of the user (e.g., if the user takes longer than average to respond, or responds more quickly than average), what financial services are being recommended, and other factors.

In an embodiment, the user may communicate continuously from the moment the user is authenticated until the user exits the user interface, with the personalized AI/ML chatbot via the user interface. Communications may be through any suitable input method, including, inter alia, text, audio, or audiovisual inputs.

In an embodiment, the user interface may include VR/AR (virtual reality/augmented reality) compatibility. In this embodiment, the user interface may allow the user to interact with the personalized chatbot in the metaverse, or with augmented reality devices. This may provide a more human and personalized experience to the user.

In an embodiment, the personalized AI/ML chatbot may include an avatar. The avatar may be two-dimensional or three-dimensional. The avatar may represent the chatbot when communicating with the user. The avatar may be selectable by the user. The avatar may be modifiable by the user. Allowing the user to modify the avatar may extend the personalization of the chatbot. The avatar may appear in VR/AR space. The avatar may appear on a screen of the user device.

Various financial services may be recommended by the personalized chatbot. Each of these services may be personalized to the user. For example, if the service is checking an account balance, the provided link may take the user directly to the financial institution webpage displaying the account balance, without the user being required to login again. Or the chatbot may pull the information directly and display or communicate the account balance to the user directly within the user interface.

In an embodiment, one of the one or more financial services may include checking an account balance.

In an embodiment, one of the one or more financial services may include transferring funds between accounts or to pay bills/invoices.

In an embodiment, one of the one or more financial services may include an investment recommendation.

In an embodiment, one of the one or more financial services may include financial planning.

In an embodiment, one of the one or more financial services may be modified by the personalized AI/ML chatbot based on one or more communications from the user. For example, the user may state that she does not want financial planning, or would prefer account services, etc., the chatbot may then modify the recommended services. Alternatively, the chatbot may factor into its recommended services the past history of the user and other inputs by the user.

Other financial services may be included as well. In various embodiments, other services, besides financial services, may be offered by the personalized chatbot.

In an embodiment, the one or more financial records may be stored by the central server in an encrypted file and may only be accessible by the personalized AI/ML chatbot. Encryption may be through any suitable method. Limiting access may prevent other personalized chatbots or other AI/ML algorithms from using the user's confidential information.

An apparatus for a personalized artificial intelligence/machine learning ("AI/ML") chatbot is provided. The apparatus may include a central server and a smartphone belonging to or assigned to a user.

The central server may include a server communication link, a server processor, and a server non-transitory memory.

The server non-transitory memory may be configured to store at least a server operating system, a personalized AI/ML chatbot that runs on the server processor, and an authentication engine that runs on the server processor.

The smartphone may belong to or be assigned to a particular user. The smartphone may include a smartphone communication link, a smartphone processor, and a smartphone non-transitory memory. The smartphone non-transitory memory may be configured to store at least a smartphone operating system, a user interface of the personalized AI/ML chatbot that runs on the smartphone processor, and a smartphone authentication program that runs on the smartphone processor and communicates with the authentication engine.

The personalized AI/ML chatbot may be personalized for the user. The personalized AI/ML chatbot may receive access to one or more financial records of the user. The personalized AI/ML chatbot may create a profile of the user. The profile of the user may include authentication data and the one or more financial records (i.e., the data or information within the one or more financial records).

When the user operates the user interface on the user device, the device authentication program may transmit an authentication request to the authentication engine. The authentication engine may receive the authentication request.

When the authentication engine authenticates the user, the personalized AI/ML chatbot may recommend one or more financial services to the user based on the user profile. The personalized AI/ML chatbot may display an access link to each of the one or more financial services it has recommended. The personalized AI/ML may be trained, at least, on responses from the user to the one or more recommended financial services. The training may include determining if the response or non-response occurred within a pre-determined length of time.

A method for personalizing an artificial intelligence/machine learning ("AI/ML") chatbot to a user is provided. The method may include the step of receiving, at the personalized AI/ML chatbot, which may be located on a server, one or more financial records belonging to the user. The chatbot may also receive authentication data for the user, to authenticate the user.

In various embodiments, these records may be received before, or after, a user begins a communications session with the chatbot. For example, the user may provide the records, or access to the records when signing up for the personalized chatbot service. Alternatively, the user may begin a communications session with the chatbot and then provide the records or access to the records. Or an entity or database may provide the records or access to the records.

The method may include the step of analyzing, by the personalized AI/ML chatbot, the one or more financial records.

The method may include the step of creating, by the personalized AI/ML chatbot, a profile of the user. The profile may include authentication data and the analysis of the one or more financial records.

The method may include the step of determining, by the personalized AI/ML chatbot, one or more financial services to offer to the user based on the profile.

When the user operates an application comprising a user interface, the method may include the steps of starting a communications session with the personalized AI/ML chatbot and of transmitting, from the application, an authentication request to the personalized AI/ML chatbot. The method may include the step of receiving the authentication request at the server and authenticating the user. The method may include the step of recommending, by the personalized AI/ML chatbot, one or more financial services to the user based on the profile. The method may include the step of displaying, on the application, an access link to each of the one or more financial services.

In an embodiment, the server may be centralized.

In an embodiment, the server may be decentralized.

In an embodiment, the method may include the step of training the personalized AI/ML chatbot at least on responses from the user to the one or more financial services.

In an embodiment, the user profile may further include past history of communications from the user. These past communications may be used to train the personalized chatbot.

In an embodiment, the user interface may be similar to the personalized AI/ML chatbot, such as a user-facing version of the chatbot. The user device authentication program may be similar to the authentication engine on the server. The user device authentication program may be a module of the authentication engine. The device authentication engine may be a separate application or program. The device authentication engine may be a part of an existing application or program (e.g., a plugin module) and may be configured to be added to numerous and varied existing applications or programs.

In an embodiment, the user device may be a smartphone or other mobile computing device. In this, and other, embodiments, the device authentication program may utilize smartphone technology such as a touchscreen or biometric sensors. The device authentication engine may be integrated into a stand-alone application or integrated into the user interface or other applications. For example, a financial institution may have an existing application for its customers. The device authentication engine may be added to the existing application, providing an easy and useful ability for users to authenticate before or during a communication with the financial institution and the personalized chatbot. Various graphical representations of the device authentication engine may be used, such as a check box, an icon, or other appropriate button.

In an embodiment, when the device authentication program is integrated into an existing application, the user must log into the existing application before.

In an embodiment, the central server may only communicate authentication results back to the user device, when the user device is in communication with the entity. For example, the central server may only inform the user device the user is authenticated if the user is communicating with the chatbot using the user device, such as a smartphone.

In an embodiment, authentication may include a continuously operating authenticating channel. The channel may stay active for a pre-determined amount of time. The pre-determined amount of time may be adjusted manually or through an artificial intelligence/machine learning ("AI/ML") algorithm(s). For example, the amount of time may change based on the chatbot, the user, or the nature of the communication. If the algorithm learns that a certain type of call will take 30 minutes, it may keep the channel open for multiple or continuous authentication. If the call is anticipated to last less than five minutes, the algorithm may determine that a single authentication by the user is sufficient. The channel may include a continuous stream of data acting as a signal between the chatbot and the user device. The signal may be random noise or may contain information authenticating the user, such as a continuous stream of authenticating data (which may repeat). In other embodiments, the continuous stream of data may be a simple ping message, letting each node on the channel know the channel is open and ready for other data.

In an embodiment, the authentication data may be created by the user, stored by the entity in an encrypted file, and only accessible by the entity. For example, when creating an account with an entity, the user may supply one or more passwords or other details that the user desires the server use to authenticate the user. Those password(s) may be encrypted and stored by the server in a database accessible only by the authentication engine.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
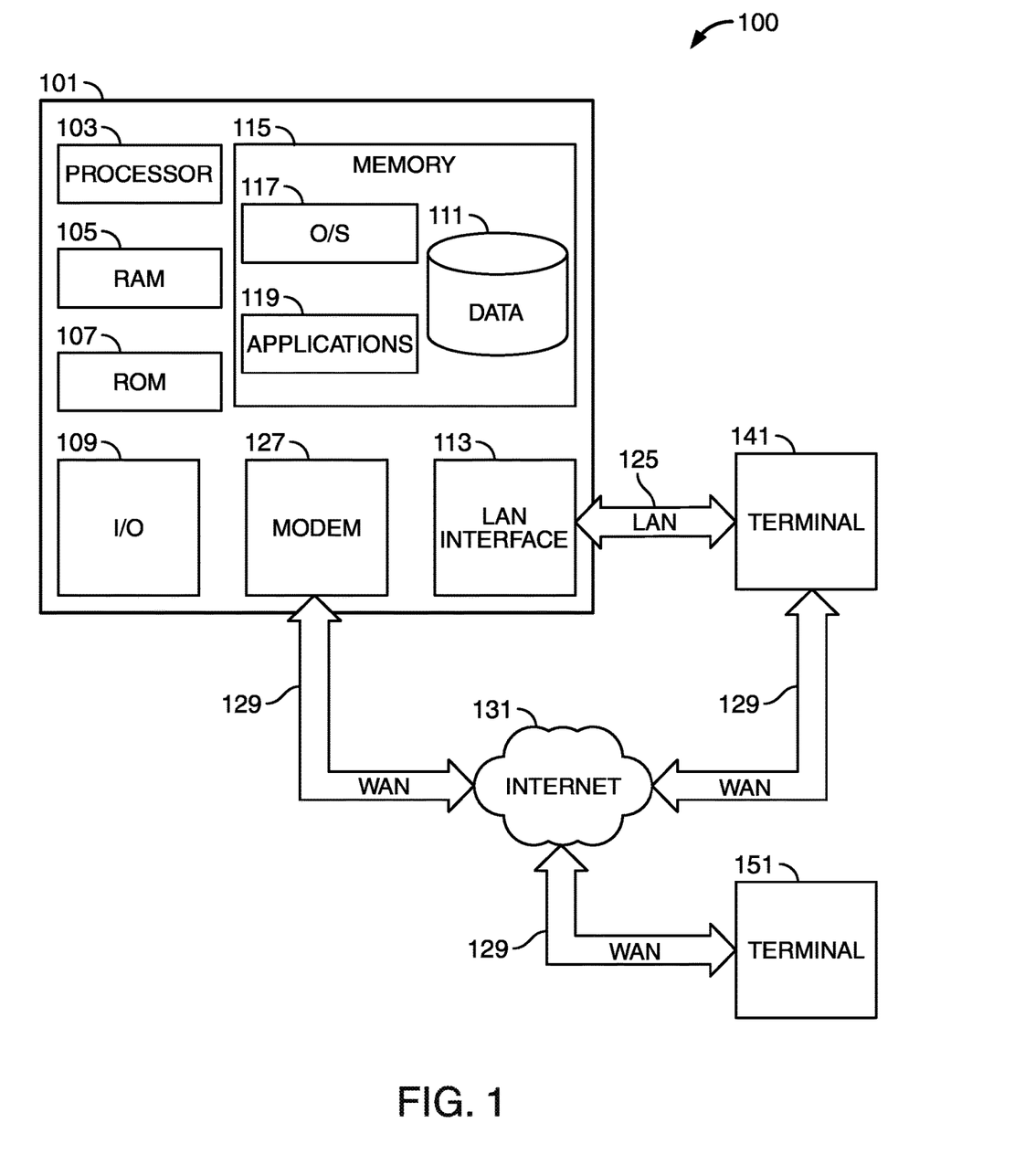
FIG. 1 shows an illustrative apparatus in accordance with principles of the disclosure.

In accordance with principles of the disclosure, FIG. 1 shows an illustrative block diagram of apparatus 100 that includes a server 101. Server 101 may alternatively be referred to herein as a "computing device." The components of server 101 may also be the same as, or similar to, the components of the entity hub, the user device, the authentication device, and the user's smartphone or other mobile device, as described above. Elements of apparatus 100, including server 101, may be used to implement various aspects of the apparatus and methods disclosed herein. A "user" of apparatus 100 or server 101 may include other computer systems or servers, or a human.

Server 101 may have one or more processors/microprocessors 103 for controlling the operation of the device and its associated components, and may include RAM 105, ROM 107, input/output module 109, and a memory 115. The microprocessors 103 may also execute all software running on the server 101—e.g., the operating system 117 and applications 119 such as the authentication engine and security protocols. Other components commonly used for computers, such as EEPROM or Flash memory or any other suitable components, may also be part of the server 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as the personalized chatbot and the authentication engine) along with any other data 111 (e.g., authentication information for users and entities) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

In an embodiment of the server 101, the microprocessor 103 may execute the instructions in all or some of the operating system 117, any applications 119 in the memory 115, any other code necessary to perform the functions in this disclosure, and any other code embodied in hardware or firmware (not shown).

An input/output ("I/O") module 109 may include connectivity to a keyboard, monitor, microphone, or network interface through which higher hierarchal server or a user of server 101 may provide input. The input may include input relating to cursor movement. The input/output module 109 may also include one or more speakers for providing audio output and a video display device, such as an LED screen and/or touchscreen, for providing textual, audio, audiovisual, and/or graphical output (not shown).

In an embodiment, apparatus 100 may consist of multiple servers 101, along with other devices.

Apparatus 100 may be connected to other systems, computers, servers, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. The network connections depicted in FIG. 1 include a local area network (LAN) 125 and a wide area network (WAN) 129 but may also include other networks. Server 101 may include a network interface controller (not shown), which may include a modem 127 and LAN interface or adapter 113, as well as other components and adapters (not shown).

When used in a LAN networking environment, server 101 is connected to LAN 125 through a LAN interface or adapter 113. When used in a WAN networking environment, server 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The server may transmit data to any other suitable computer system. The server may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for invoking user functionality related to performing various tasks. In an embodiment, application program(s) 119 may be cloud-based applications. In an embodiment, application program(s) 119 may be programs such as the personalized chatbot and the authentication engine and/or security protocols. In an embodiment, the chatbot and/or authentication engine may use one or more AI/ML algorithm(s). The various tasks may be related to providing a personalized AI/ML chatbot to a user.

Server 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, smart mobile device, or any other suitable device for receiving, storing, transmitting and/or displaying relevant information. Terminal 151 and/or terminal 141 may be other devices such as remote servers. The terminals 151 and/or 141 may be computers where the user is interacting with the application that is being monitored by apparatus 100.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, server computers, hand-held or laptop devices, tablets, mobile phones, smart phones, smart mobile devices, and/or other personal digital assistants ("PDAs"), multiprocessor systems, microprocessor-based systems, set top boxes, programmable consumer electronics, network PCS, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules maybe located in both local and remote computer storage media including memory storage devices.

Figure 2:
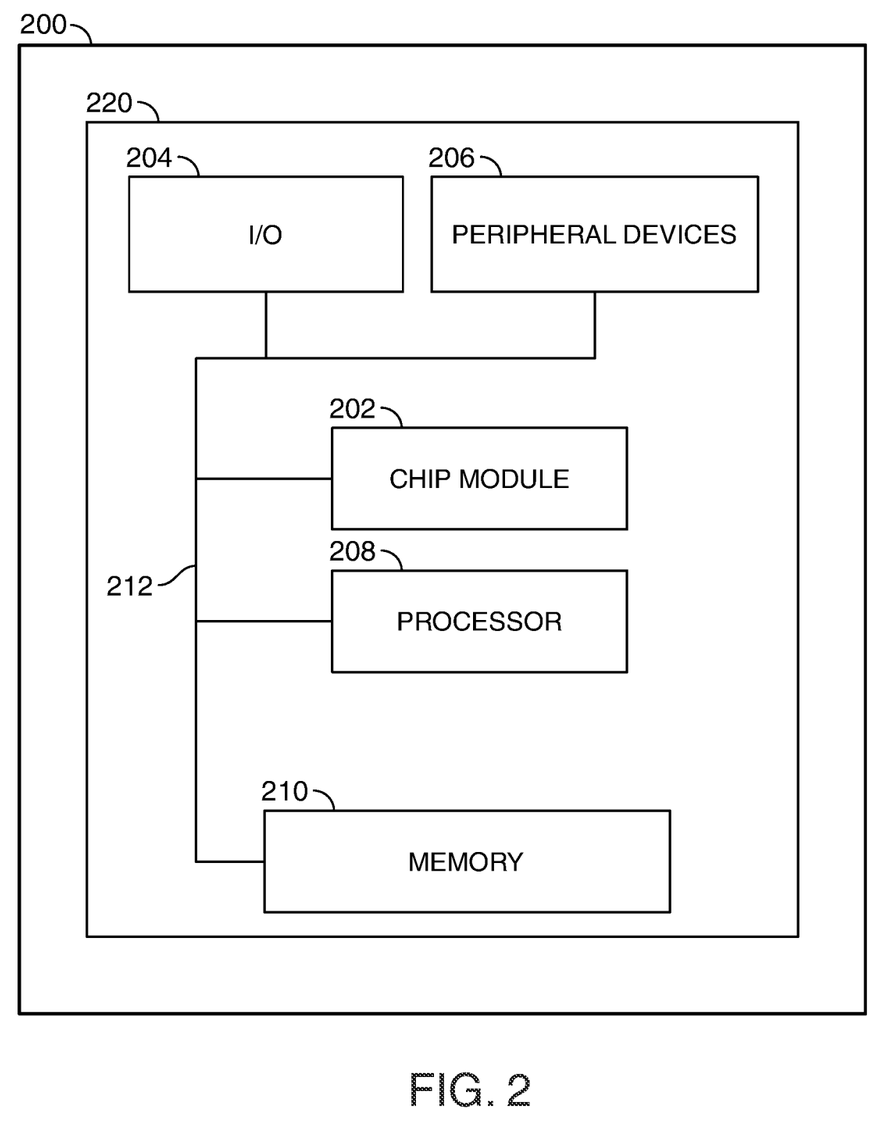
FIG. 2 shows an illustrative apparatus in accordance with principles of the disclosure.

FIG. 2 shows illustrative apparatus 200 that may be configured in accordance with the principles of the disclosure. Apparatus 200 may be a smartphone, authentication device, user device, computer, or server with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an LED screen, a touchscreen or any other suitable media or devices; peripheral devices 206, which may include hands-free smart mobile devices; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
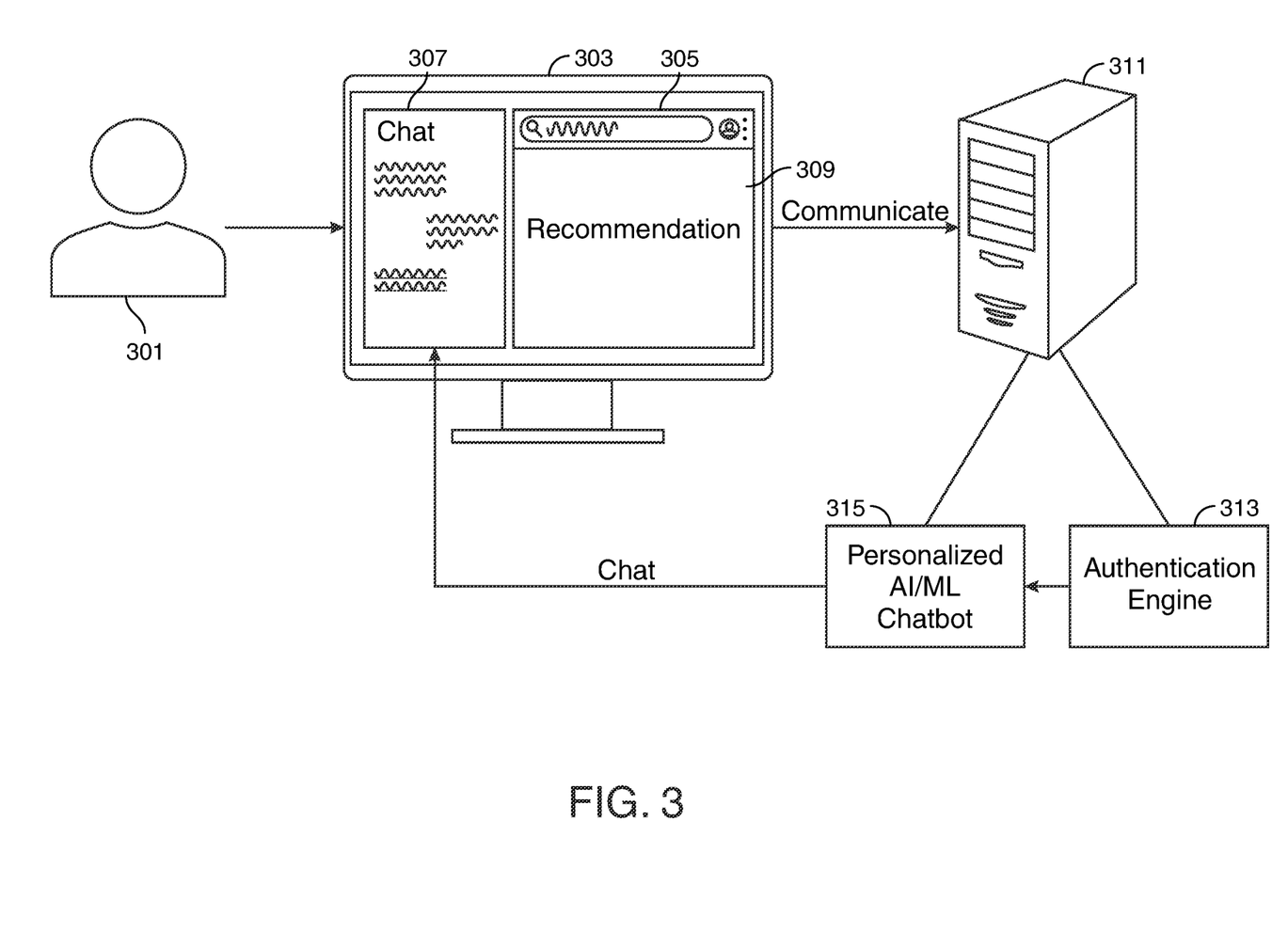
FIG. 3 shows an illustrative schematic in accordance with principles of the disclosure.

FIG. 3 shows an illustrative schematic in accordance with principles of the disclosure. A user 301 may be assigned (or have/own) a user device 303. User device 303 may include a display or other user interface 305. User interface 305 may include a chatbot section 307 and a browser 309.

User device 303, when prompted by the user 301, may communicate with a server 311. The server 311 may be centralized or distributed.

Server 311 may include an authentication engine 313 and a personalized AI/ML chatbot 315. The authentication engine 313 may be a module or portion of the personalized chatbot 315.

When the user 301 is authenticated by the authentication engine 313, the personalized chatbot 315 may communicate with the user 301 through the user interface 305, such as through chatbot section 307. Other communication protocols (AR/VR, audiovisual, audio, etc.) may be used.

Figure 4:
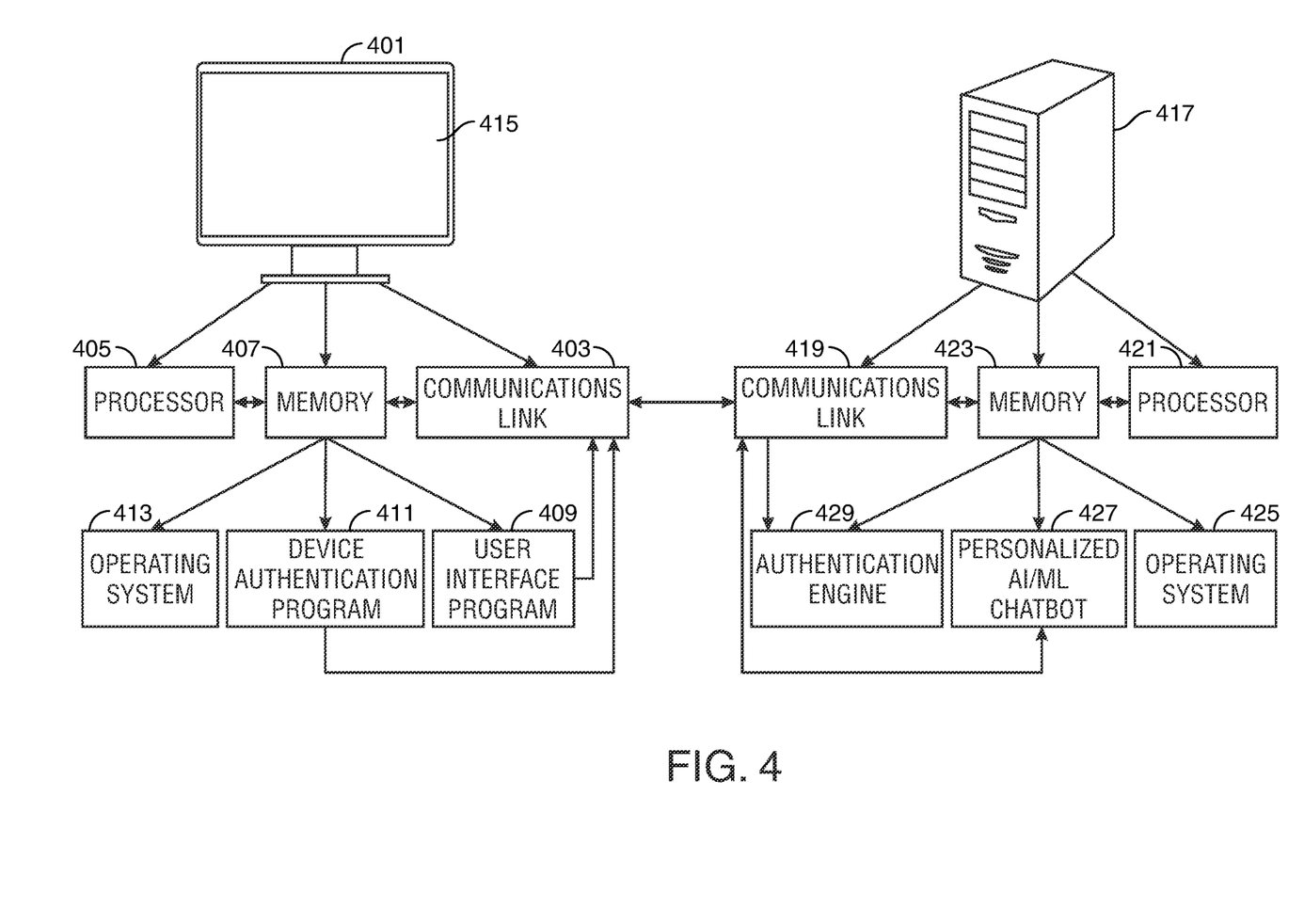
FIG. 4 shows an illustrative schematic in accordance with principles of the disclosure.

FIG. 4 shows an illustrative schematic in accordance with principles of the disclosure. User device 401 may be a computing device. User device 401 may include a user device communication link 403, a user device processor 405, user device memory 407, as well as other components (not shown). User device 401 may communicate with server 417 and receive communications from server 417. Server 417 may be centralized or distributed.

Server 417 may include server communication link 419, server processor 421, server memory 423, as well as other components (not shown). Server 417 may communicate with user device 401 over communications link 419.

Communications links 403 and 419 may be connected directly or over a network, such as the Internet.

User device memory 407 may include user device operating system 413, user device authentication program 411, and a user interface program 409, among other programs and data. user device 401 may include a user interface 415, such as a display screen. The device authentication program 411 and user interface program 409 may communicate with server 417 through the device communications link 403.

Server memory 423, may include a server operating system 425, a personalized AI/ML chatbot 427, and a server authentication engine 429, as well as other programs and data (not shown). The AI/ML chatbot 427 and authentication engine 429 may communicate with the user device 401 through server communications link 419.

Figure 5:
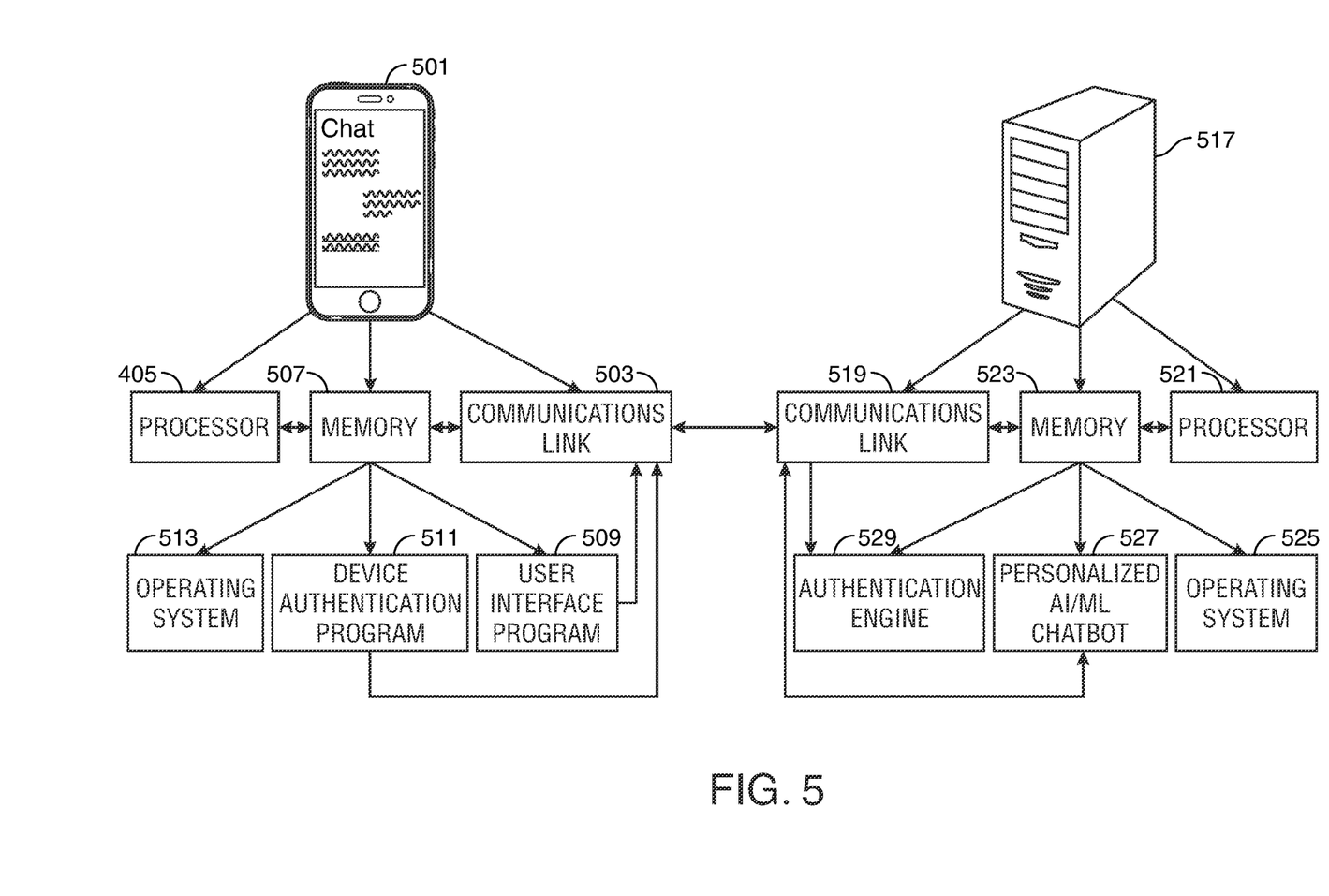
FIG. 5 shows an illustrative schematic in accordance with principles of the disclosure.

FIG. 5 shows an illustrative schematic in accordance with principles of the disclosure. Smartphone 501 may be a user device. Smartphone 501 may be a different type of mobile device, such as a laptop or tablet. Smartphone 501 may include a smartphone communication link 503, a smartphone processor 505, smartphone memory 507, as well as other components (not shown). Smartphone 501 may communicate with server 517 and receive communications from server 517 over communications link 503. Server 517 may be centralized or distributed.

Communications link 503 may incorporate any mobile communications protocol, such as wi-fi, bluetooth, 3G, 4G, LTE, 5G, etc.

Server 517 may include server communication link 519, server processor 521, server memory 523, as well as other components (not shown). Server 517 may communicate with smartphone 501 over communications link 519.

Communications links 503 and 519 may be connected directly or over a network, such as the Internet.

Smartphone memory 507 may include smartphone operating system 513, smartphone authentication program 511, and a user interface program 509, among other programs and data. smartphone 501 may include a user interface 515, such as a display screen. The device authentication program 511 and user interface program 509 may communicate with server 517 through the smartphone communications link 503.

Server memory 523, may include a server operating system 525, a personalized AI/ML chatbot 527, and a server authentication engine 529, as well as other programs and data (not shown). The AI/ML chatbot 527 and authentication engine 529 may communicate with the smartphone 501 through server communications link 519.

Figure 6:
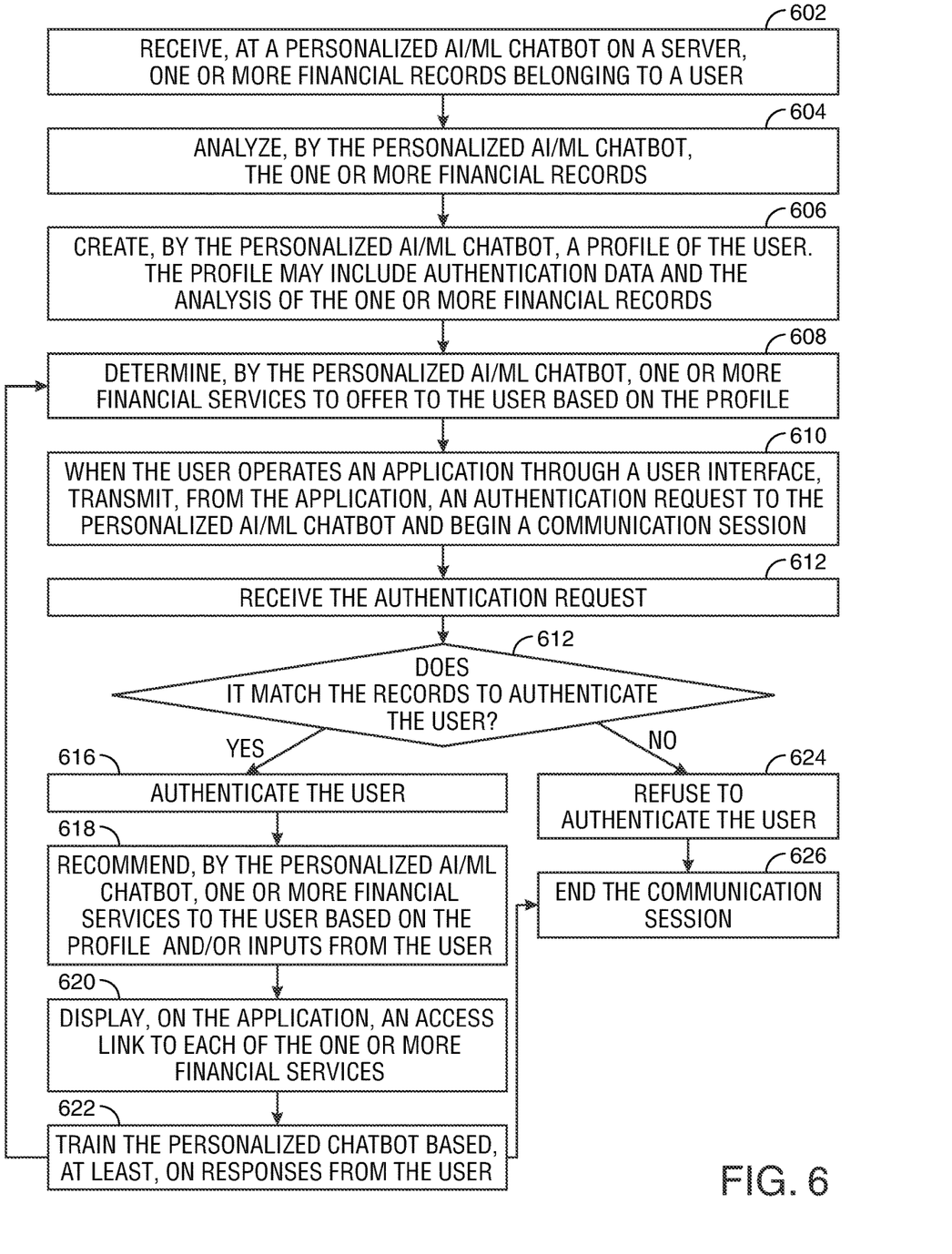
FIG. 6 shows an illustrative flowchart in accordance with principles of the disclosure.

FIG. 6 shows an illustrative flowchart in accordance with principles of the disclosure. Methods may include some or all of the method steps numbered 602 through 626. Methods may include the steps illustrated in FIG. 6 in an order different from the illustrated order. The illustrative method shown in FIG. 6 may include one or more steps performed in other figures or described herein. Steps 602 through 626 may be performed on the apparatus shown in FIGS. 1-5, or other apparatus.

At step 602, a personalized Ai/ML chatbot on a server may receive one or more financial records belonging to a user, along with data used to authenticate the user. The server may be centralized or distributed.

At step 604, personalized chatbot may analyze the one or more financial records, or the data included within the financial records. The analysis may be performed through one or more AI/ML algorithms.

At step 606, the personalized chatbot may create a profile of the user. The profile may include the data within the one or more financial records, the analysis of the data, and authentication data, as well as other information.

At step 608, the personalized chatbot may determine one or more financial services to offer to the user based on the user profile. The determination may be through one or more AI/ML algorithms.

At step 610, when the user operates an application on a user device through a user device interface, the suer device may transmit, from the application, an authentication request to the personalized chatbot (or the server), along with other information, such as a request to communicate with the chatbot or create a communications session with the chatbot.

At step 612, the server or the personalized chatbot may receive the authentication request or other information from the user device.

At step 614, the personalized chatbot may determine if the request matches records in order to authenticate the user. If not, at step 624, the chatbot may refuse to authenticate the user and end the communications session at step 626.

If the request matches the records, at step 616, the chatbot may authenticate the user.

Once the user is authenticated, a communications session may continue. At step 618, the chatbot may recommend one or more financial services to the user based on the profile and/or inputs from the user. These recommendations or other communications from the chatbot may be transmitted to the user device (i.e., programs or browsers on the user device).

At step 620, the application (or browser, etc.) may display an access link to each of the one or more financial services recommended at step 618. The application (or browser) may also display communications from the AI/ML chatbot.

At step 622, the AI/ML chatbot may train itself based, at least, on responses from the user, such as selecting or not selecting the links displayed at step 620.

The communications session between the user and the personalized chatbot may then end at step 626.

Thus, apparatus and methods for a personalized AI/ML chatbot are provided. Persons skilled in the art will appreciate that the present invention can be practiced by other than the described embodiments, which are presented for purposes of illustration rather than of limitation.

What is claimed is:

1. An apparatus for a personalized artificial intelligence/machine learning ("AI/ML") chatbot, the apparatus comprising:
a central server, the central server comprising:
 a server communication link;
 a server processor; and
 a server non-transitory memory configured to store at least:
  a server operating system;
  a personalized AI/ML chatbot that runs on the server processor; and
  an authentication engine that runs on the server processor; and
a user device belonging to a user, the user device comprising:
a device communication link;
a device processor; and
a device non-transitory memory configured to store at least:
 a device operating system;
 a user interface of the personalized AI/ML chatbot that runs on the device processor; and
 a device authentication program that runs on the device processor and communicates with the authentication engine;
wherein:
the personalized AI/ML chatbot is personalized for the user;
the personalized AI/ML chatbot comprises an avatar modifiable by the user;

the personalized AI/ML chatbot receives access to one or more financial records, at an entity, of the user;
the personalized AI/ML chatbot creates a profile of the user comprising authentication data and the one or more financial records; and
when the user operates the user interface:
   the device authentication program transmits an authentication request to the authentication engine;
   the authentication engine receives the authentication request; and
   when the authentication engine authenticates the user:
      the personalized AI/ML chatbot recommends one or more financial services at the entity to the user based on the profile; and
      displays an access link to each of the one or more financial services, wherein when the user accesses the link, the user is not required to login at the entity.

2. The apparatus of claim 1 wherein the user device is a smartphone.

3. The apparatus of claim 1 wherein when the user selects the access link, the personalized AI/ML chatbot analyzes the selection to train the personalized AI/ML chatbot.

4. The apparatus of claim 1 wherein when the user fails to select the access link within a pre-determined length of time, the personalized AI/ML chatbot analyzes the failure to select to train the personalized AI/ML chatbot.

5. The apparatus of claim 1 wherein the user continuously communicates with the personalized AI/ML chatbot via the user interface.

6. The apparatus of claim 1 wherein the user interface comprises VR/AR compatibility.

7. An apparatus for a personalized artificial intelligence/machine learning ("AI/ML") chatbot, the apparatus comprising:
   a central server, the central server comprising:
      a server communication link;
      a server processor; and
      a server non-transitory memory configured to store at least:
         a server operating system;
         a personalized AI/ML chatbot that runs on the server processor; and
         an authentication engine that runs on the server processor; and
   a smartphone belonging to a user;
wherein:
the personalized AI/ML chatbot is personalized for the user;
the personalized AI/ML chatbot comprises an avatar modifiable by the user;
the personalized AI/ML chatbot receives access to one or more financial records, at an entity, of the user;
the personalized AI/ML chatbot creates a profile of the user comprising authentication data and the one or more financial records;
when the user operates an application on the smartphone comprising a user interface:
   the smartphone transmits an authentication request to the authentication engine;
   the authentication engine receives the authentication request;
   when the authentication engine authenticates the user:
      the personalized AI/ML chatbot recommends one or more financial services at the entity to the user based on the profile; and
      displays an access link to each of the one or more financial services, wherein when the user accesses the link, the user is not required to login at the entity; and
the personalized AI/ML is trained at least on responses received within a pre-determined length of time from the user to the one or more financial services.

8. The apparatus of claim 7 wherein one of the one or more financial services comprises checking an account balance.

9. The apparatus of claim 7 wherein one of the one or more financial services comprises transferring funds between accounts.

10. The apparatus of claim 7 wherein the one of the one or more financial services comprises an investment recommendation.

11. The apparatus of claim 7 wherein the pre-determined length of time is one minute.

12. The apparatus of claim 7 wherein one of the one or more financial services comprises financial planning.

13. The apparatus of claim 7 wherein one of the one or more financial services is modified by the personalized AI/ML chatbot based on one or more communications from the user.

14. The apparatus of claim 13 wherein the one or more financial records are stored by the central server in an encrypted file and are only accessible by the personalized AI/ML chatbot.

15. A method for personalizing an artificial intelligence/machine learning ("AI/ML") chatbot to a user, the method comprising:
   receiving, at a personalized AI/ML chatbot on a server, one or more financial records, at an entity, belonging to the user;
   analyzing, by the personalized AI/ML chatbot, the one or more financial records;
   creating, by the personalized AI/ML chatbot, a profile of the user, wherein the profile comprises authentication data and the analysis of the one or more financial records;
   determining, by the personalized AI/ML chatbot, one or more financial services from the entity to offer to the user based on the profile; and
   when the user operates an application comprising a user interface:
      transmitting, from the application, an authentication request to the personalized AI/ML chatbot;
      receiving the authentication request;
      authenticating the user;
      recommending, by the personalized AI/ML chatbot, one or more financial services at the entity to the user based on the profile; and
      displaying, on the application, an access link to each of the one or more financial services, wherein when the user accesses the link, the user is not required to login at the entity.

16. The method of claim 15 wherein the server is centralized.

17. The method of claim 15 wherein the server is decentralized.

18. The method of claim 15 further comprising the step of training the personalized AI/ML chatbot at least on responses from the user to the one or more financial services.

19. The method of claim 15 wherein the user profile further comprises past history of communications from the user.

* * * * *